H. L. & J. P. ZIEGLER.
HEAD GATE.
APPLICATION FILED OCT. 8, 1912.
1,065,761. Patented June 24, 1913.
3 SHEETS—SHEET 1.
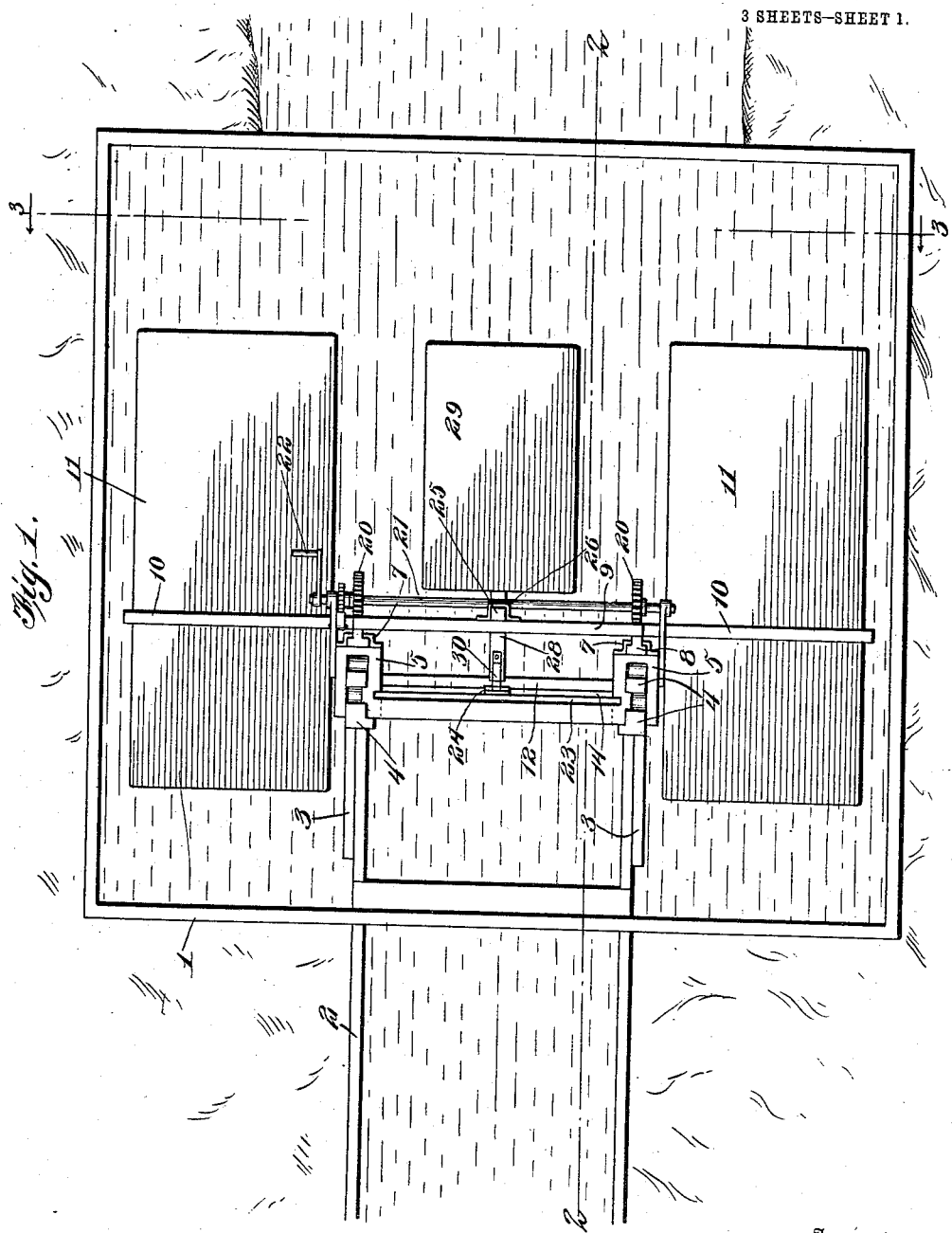
Witnesses
Inventors
Henry L. Ziegler
John P. Ziegler
By Victor J. Evans
Attorney

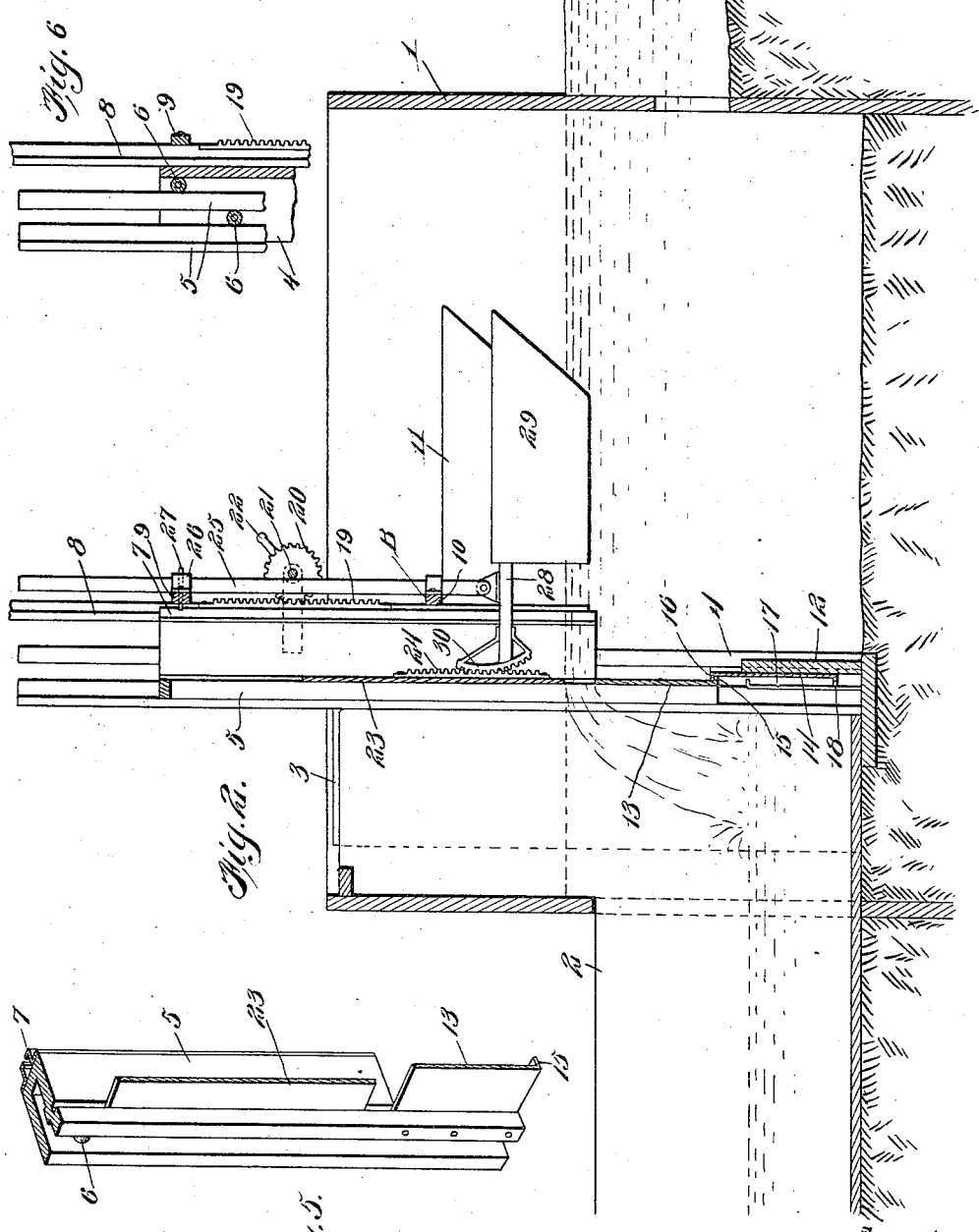

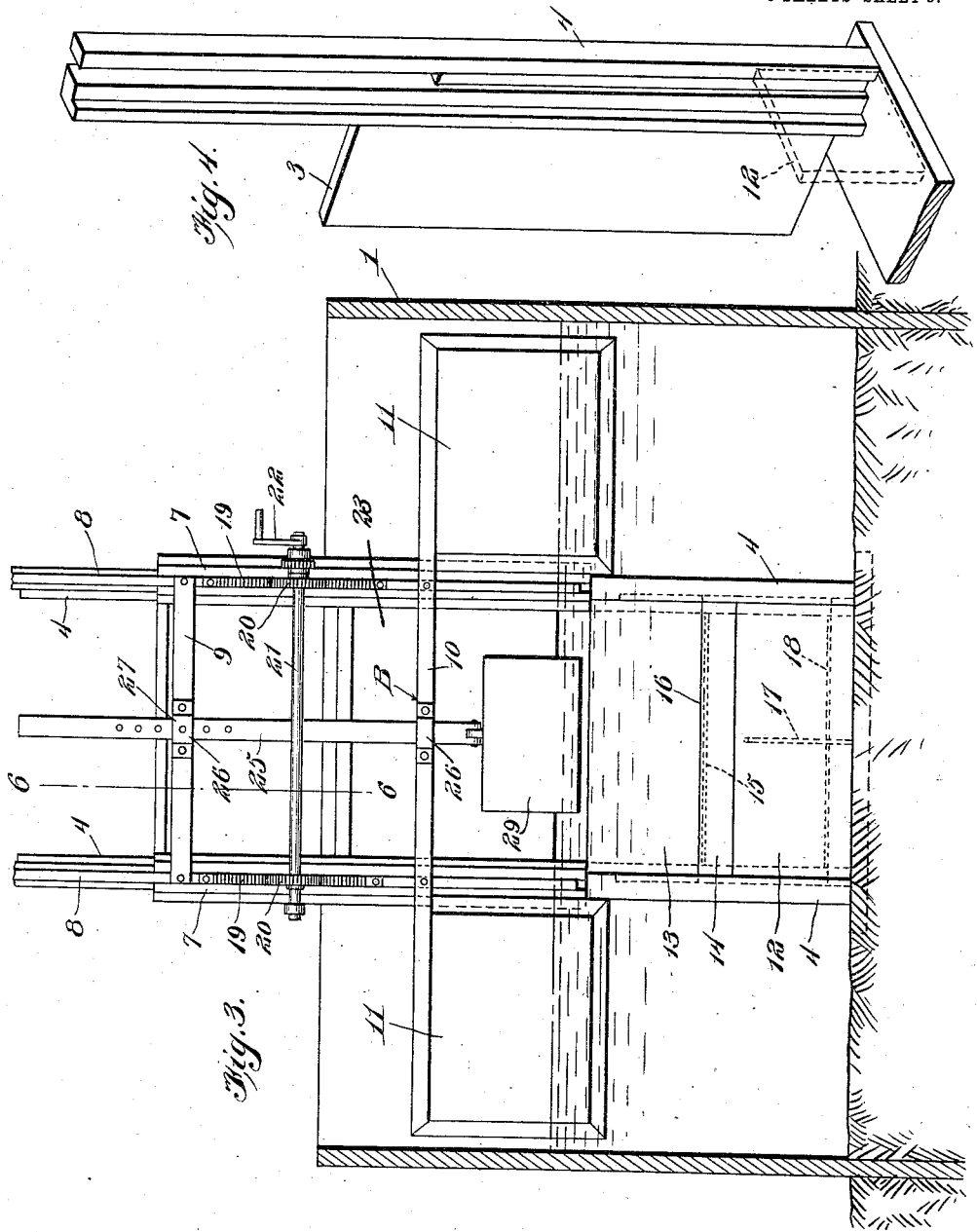

UNITED STATES PATENT OFFICE.

HENRY L. ZIEGLER AND JOHN P. ZIEGLER, OF NEW BRIDGE, OREGON.

HEAD-GATE.

1,065,761. Specification of Letters Patent. Patented June 24, 1913.

Application filed October 8, 1912. Serial No. 724,565.

*To all whom it may concern:*

Be it known that we, HENRY L. ZIEGLER and JOHN P. ZIEGLER, citizens of the United States, residing at New Bridge, in the county of Baker and State of Oregon, have invented new and useful Improvements in Head-Gates, of which the following is a specification.

This invention relates to head gates for controlling the flow of water in irrigation ditches and the like, and the principal object of the invention is to produce a gate of simple and effective construction whereby the flow of water will be automatically regulated.

A further object of the invention is to provide the gate with an adjustable pressure board, whereby the pressure of the water passing the gate may be regulated and maintained constant.

A further object of the invention is to provide simple and effective means for automatically adjusting and controlling the pressure board to compensate for the slight delays occurring when the gate starts to rise or to fall, owing to the change of level in the ditch or stream in connection with which it is used.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a device constructed in accordance with the invention. Fig. 2 is a vertical sectional view taken longitudinally through the device on the line 2—2 in Fig. 1. Fig. 3 is a vertical transverse sectional view taken on the line 3—3 in Fig. 1. Fig. 4 is a perspective detail view showing one side of the main frame 3. Fig. 5 is a perspective detail view showing a portion of the vertically slidable gate frame. Fig. 6 is a sectional detail view taken on the line 6—6 in Fig. 3.

Corresponding parts in the several figures are denoted by like characters of reference.

Referring to the drawings, 1 designates a box or casing which is in communication with a source of water supply, such as a ditch or stream, so that the water level in said box or casing will be controlled by such source. The box is provided with a flume or outlet 2 having a frame 3 which is tightly connected with the box so as to prevent leakage. The frame 3 includes uprights 4 which are grooved or otherwise constructed to constitute guides for the vertically slidable gate frame 5 which is equipped with roller bearings 6 engaging the uprights 4 so as to enable the vertically movable gate frame to operate freely and without undue friction.

The movable gate frame 5 is provided with guides 7 for the vertically adjustable float frame B which includes side members or uprights 8 that operate in the guides 7 and which are connected together by cross bars 9, 10, the latter of which is extended beyond the side members to support the floats 11 which are suitably connected therewith.

The frame 3 supports at the bottom thereof a baseboard 12, the upper edge of which is at the level of the bottom of the ditch or stream which constitutes the source of supply.

The vertically movable gate frame 5 carries the gate 13, the upper edge of which is about level with the upper edge of the board 12 when the frame 5 is at the downward limit of its movement.

An extension gate 14 is provided which, when the frame 5 is in a lowered position, is accommodated between the gate 13 and the baseboard 12. The lower edge of the gate 13 is provided with a flange 15 which when the gate moves in an upward direction is adapted to engage a corresponding flange 16 on the extension gate 14, which latter is thus capable of rising with the gate carried by the frame 5 for the purpose of obstructing passage of water through the lower part of the frame 3. The side members or uprights of the frame 3 are grooved for the accommodation of the extension gate 14, and a hooked rod 17 rising from the sill of the frame 3 is adapted to engage a flange 18 at the lower edge of the extension gate 14 for the purpose of limiting the upward movement thereof.

For the purpose of effecting proper adjustment of the float frame B with respect to the gate frame 5, the side members or uprights 8 of said float frame may be provided with racks 19, said racks being engaged by the cog wheels 20 on a shaft 21 which is supported for rotation on the gate frame and which may be rotated by means of a suitable crank 22. Any suitable well known locking means may be used for the purpose of maintaining the float frame at the desired adjustment with respect to the gate frame.

The side members of the gate frame are grooved for the reception of a pressure board 23 having on the face thereof a rack 24. The lower edge of this pressure board, when the latter is in its lowermost position, coincides with the upper edge of the gate 13 and fits tightly thereon so as to obstruct the passage of water. The pressure board, however, may be raised so as to permit water to overflow the gate and to regulate and control such overflow. To effect the desired adjustment of the pressure board, a vertically slidable bar 25 is mounted in suitable keepers 26 on the cross bars 9 and 10 of the float frame, said bar being capable of being secured at various adjustments by a pin or screw 27. Hingedly connected with the lower end of the bar 25 is an arm 28 carrying a float 29. Said arm is also provided at one end thereof with a toothed segment 30 meshing with the rack 24. It will be seen that by adjusting the sliding bar 25, the segment 30 being in mesh with the pressure board, the latter may be raised or lowered to the desired position with respect to the upper edge of the gate 13. An independent and automatic adjustment of the pressure board will be effected by the rise and fall of the float 29 on the arm 28, the pressure board being lowered and raised by such rise and fall, as will be very evident.

In the operation of this invention, the float frame may be adjusted with respect to the gate frame so as to maintain the upper edge of the gate 13 constantly in a predetermined position with respect to the water level. The quantity of water permitted to pass over the gate, as well as the pressure of such water, may be determined by proper adjustment of the pressure board. At times when the gate frame, under the influence of the floats, starts to rise or fall owing to a change in the water level there is apt to be a slight delay caused by friction, but the irregularity caused by such delays will be counterbalanced by the float 29 which when the water rises beyond the predetermined level with respect to the gate 13 will operate to move the pressure board in the direction of said gate, thereby temporarily reducing the area of the opening through which water may escape, while, on the other hand, when the water falls below the predetermined level, the float 29 will operate to raise the pressure board, thereby increasing the area of the escape opening. As soon as the gate frame acts properly under the influence of the floats 11, normal conditions will be restored.

The box or casing 1 is to be made of suitable dimensions to accommodate the floats of the device, said floats and other mechanism of the gate being thus protected from injury by floating wood or other material carried by the irrigating water.

Having thus described the invention, what is claimed as new, is:—

1. In a device of the character described, a guide frame, a gate frame supported for vertical movement thereon, and a float frame mounted on the gate frame for vertical adjustment with respect thereto.

2. In a device of the class described, a guide frame having a baseboard, a gate frame vertically movable on the guide frame, an extension gate supported movably by the guide frame, said gate and extension gate having interengaging flanges, and a float carrying frame associated with the gate frame.

3. In a device of the character described, a guide frame having a baseboard, a gate frame movable on the guide frame and having a gate, and a pressure board carried by the gate frame and adjustable with respect to the gate.

4. In a device of the class described, a guide frame having a baseboard, a gate frame vertically movable on the guide frame and having a gate, a pressure board vertically movable on the gate frame, and means for effecting adjustment of the pressure board with respect to the gate.

5. In a device of the class described, a guide frame having a baseboard, a gate frame vertically movable on the guide frame and having a gate, a vertically slidable pressure board on the gate frame, a float carrying frame adjustably connected with the gate frame, a vertically movable slide on the float frame, and means associated with the said slide for effecting adjustment of the pressure board.

6. In a device of the class described, a guide frame having a baseboard, a gate frame vertically movable on the guide frame and having a gate, a vertically slidable pressure board on the gate frame, a float carrying frame adjustably connected with the gate frame, a vertically movable slide on the float frame, a float carrying arm hingedly connected with the slide and having a toothed segment, and a rack on the pressure board engaged by said toothed segment.

7. In a device of the character described, a guide frame having a baseboard, a gate frame vertically movable on the guide frame, a gate carried by the gate frame, an extension gate movably supported by the guide frame, said gate and extension gate having interengaging flanges, a pressure board vertically movable on the gate frame and coöperating with the gate to obstruct and regulate the flow of water, a float carrying frame adjustably mounted on the gate frame, a vertically movable slide on the float frame, an arm hingedly connected with said slide, a float carried by said arm, and connecting means between the arm and the pressure board, whereby positive adjustment of said pressure board will be effected by vertical adjustment of the slide carrying the arm and whereby incidental adjustment of the pressure board will be effected by the swinging movement of the arm under the influence of the float.

In testimony whereof we affix our signatures in presence of two witnesses.

HENRY L. ZIEGLER.
JOHN P. ZIEGLER.

Witnesses:
J. C. BOWEN,
W. R. USHER.

---

Copies of this patent may be obtained for five cents each, by addressing the "Commissioner of Patents, Washington, D. C."